United States Patent [19]

Kleinecke et al.

[11] 4,427,854

[45] Jan. 24, 1984

[54] RACKING MECHANISM FOR MOTOR CONTROL CENTER

[75] Inventors: John D. Kleinecke; Samir F. Farag; Thomas R. Little, all of Wichita Falls, Tex.

[73] Assignee: Siemens-Allis, Inc., Atlanta, Ga.

[21] Appl. No.: 373,092

[22] Filed: Apr. 28, 1982

[51] Int. Cl.³ .............................................. H01H 9/20
[52] U.S. Cl. .............................. 200/50 AA; 335/189; 361/337
[58] Field of Search ................. 200/50 AA; 361/336, 361/337, 338, 339; 335/74, 189, 190

[56] References Cited

U.S. PATENT DOCUMENTS 3,469,043 9/1969 Wilson ............................ 200/50 AA
3,588,398 6/1971 Siviy ............................... 200/50 AA
3,914,659 10/1975 May et al. ..................... 200/50 AA Primary Examiner—E. A. Goldberg
Assistant Examiner—Morris Ginsburg
Attorney, Agent, or Firm—Frederick W. Powers

[57] ABSTRACT

An improved mechanism for racking a contactor mechanism within an enclosure. The mechanism is urged into a fully-engaged position by an arm extending from a rotatable cross shaft which in turn is operated by a pair of complementary four-bar linkages. The first linkage in effect consists of a handle, connecting rod and bellcrank, the second consisting of the bellcrank and another arm, affixed to the cross shaft. An improved spring-loaded detent arm assists in holding the handle in the "racked on" position and a pivoted interlock engages the bellcrank in two positions.

9 Claims, 2 Drawing Figures

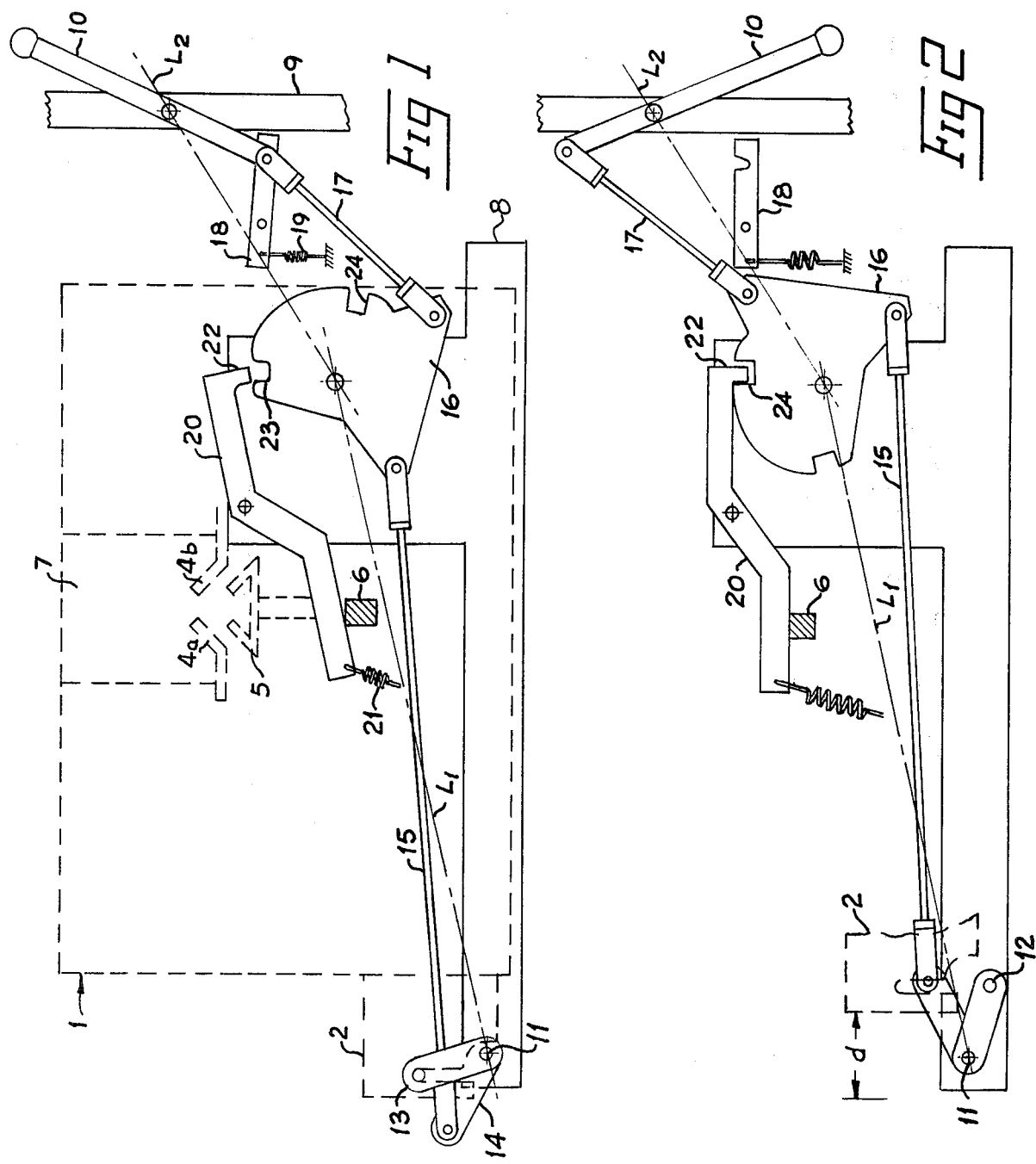

RACKING MECHANISM FOR MOTOR CONTROL CENTER

CROSS REFERENCES TO RELATED APPLICATIONS

U.S. patent applications containing generally related subject matter are Ser. No. 373,029, "Rigid Subchassis for High Voltage Controller"—Farag, filed Apr. 28, 1982; and Ser. No. 377,436 "Defeatable Handle and Interlock for Electrical Equipment Enclosure"—Kleinecke, filed May 12, 1982.

BACKGRUND OF THE INVENTION

The present invention relates to motor control centers or the like, and more particularly to an improved mechanism for racking a contactor mechanism within the motor control center enclosure.

Motor control centers, frequently known as "motor starters" or "controllers" are widely used in industry for starting, stopping and controlling the operation of large electric motors. While this general type of apparatus is familiar to those knowledgeable in the field of industrial electric gear, it actually encompasses a rather diverse combination of equipment. Ordinarily, various combinations of relays, current transformers, specialized overload relays, timers and other sorts of electric gear are provided in conjunction with a large current interrupting element termed a contactor. The combination serves to energize and deenergize electric motors in a predetermined manner, for instance to allow a certain limited degree of overcurrent flow during heavily loaded or start-up conditions; and to cut off current flow when overload currents are sensed at other times.

Due to the large current flow and relatively high voltages involved the equipment is normally housed within a metal enclosure, which may comprise a number of separate compartments, each containing various sorts of equipment. In some cases each compartment, or cubicle, contains roughly the same set of apparatus while in other cases different cubicles are dedicated to housing different kinds of equipment. Further, it is desirable to isolate higher-voltage equipment, such as the contactor, in one cubicle while maintaining lower-voltage control equipment in a different cubicle so that access may be had to the lower-voltage equipment without exposing high voltage gear.

The contactor basically comprises a large electromechanical switch which makes and breaks the main electric circuit. Due to its size and weight, and in order to facilitate servicing, the contactor is commonly mounted in a removable structure herein termed a carriage. Some manufacturers provide wheels on the carriages so that they can be more easily removed from their cubicles, and moved about on a floor or work surface. Other manufacturers provide wheels or other bearing means mounted within the cubicles in order to facilitate the installation and removal of the contactor carriage. In order to provide the necessary electrical connection between the carriage and the source and load circuits, which commonly are connected to rigid bus bars affixed at the back of each enclosure, the carriage is typically provided with spring-loaded fingers or stabs which grip a mating element disposed within the cubicle. In order to cause full engagement of these elements, or "racking," of the contactor carriage it is conventional to provide a manually-operated mechanism which engages the carriage and forces it to a fully engaged position.

In view of the high voltages and currents involved it is conventional, and indeed required, that each cubicle and racking mechanism be interlocked in such a fashion that the cubicle may not be opened after the contactor is engaged (racked); and also that the contactor may not be unracked when its contacts are closed. Disengaging the stabs or similar engaging means while load current is flowing could be highly destructive to the stabs or fingers, and therefore it is necessary that the contactor be fully opened, and the circuit interrupted, before disengagement (unracking) of the contactor carriage.

Due to these requirements, all controller manufacturers provide their products with interlocked racking mechanisms of various types. Various approaches including gear drives, cranks, levers, and spring-loaded systems are all in use. While it is understood that such mechanisms must be sufficiently strong to withstand abuse and unauthorized or improper usage without releasing the contactor carriage or overcoming the interlock system, it is also necessary to minimize the weight and cost of manufacture of these assemblies. At the same time, the mechanisms must be sufficiently rigid such that the manually-operated handles thereof cannot be moved to the "on" or engaged position until the contactor itself is fully racked. It will therefore be appreciated that it would be highly desirable to provide a lighter but rigid racking machanism which is not only economical to manufacture, but which may be easily manually operated.

It is therefore an object of the present invention to provide an improved racking mechanism for motor control centers or the like.

Yet another object is to provide a relatively lightweight, rigid racking mechanism including an interlock.

Another object of the invention is to construct a practical, rigid racking mechanism which may be easily manually operated.

Another object is to provide a racking mechanism for a motor control center or the like which is mounted on a rigid subchasis within a cubicle, and operated by a handle pivoted on the cubicle frame.

Another object is to provide a simple, rigid racking mechanism having a high mechanical advantage, which does not utilize spring mechanisms or the like to effect racking or unracking.

SUMMARY OF THE INVENTION

Briefly stated, in accordance with one aspect of the invention the foregoing objects are achieved by providing a rigid structure for receiving the contactor mechanism, and a cross shaft pivoted within the structure and having a pin for engaging the contactor carriage and moving it back and forth. A bellcrank pivoted to another portion of the subchassis is coupled to the cross shaft, and a pivoted handle mechanism coupled to the bellcrank by means of a second rod. Relative orientation of the bellcrank arms, the cross shaft arm, and the handle is such as to provide a compound mechanical advantage which increases as the carriage approaches its racking position. An interlock lever is pivotally mounted to the subchasis, and provided with an end which engages one or more notches in the edge of the bellcrank. A portion of the contactor which operates in conjunction with the contacts engages the interlock lever, causing the bellcrank to be immovably secured when the contactor is closed.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

FIG. 1 illustrates the principal elements of the racking mechanism and associated gear, with the contactor carriage in its racked position; and FIG. 2 illustrates the mechanism of FIG. 1 in its unracked position.

DESCRIPTION OF A PREFERRED EMBODIMENT

In FIG. 1 there is shown in outline form elements of a motor control center, including a contactor carriage 1 shown in phantom form including a racking hook 2 and a contactor which comprises a pair of fixed contacts 4a, 4b which are bridged by a movable armature 5. The armature is driven by an electromagnet in a conventional manner, and has coupled to it a square shaft 6 which extends transversely to the plane of the illustration. An arc chute 7, also shown in phantom view, extends above the fixed contacts in order to provide a chamber in which an arc may be extinguished.

It will be recognized by those skilled in the art that the above-described elements are typically provided in threes, one set for each phase to be interrupted. The arc chutes and contactors are aligned transversely to the plane of the drawing, such that shaft 6 extends across all three contacts and moves vertically up and down as the contacts close and open, respectively.

While not shown in the Figures, it is conventional for contactor carriage 1 to be supported on wheels or rollers, in order to allow the assembly to be moved in and out of the cubicle in which it is enclosed. In a presently-preferred embodiment carriage 1 is provided with wheels, which roll in appropriate channels or surfaces of rigid subchassis 8. The subchassis is formed of rigid structural elements, and disposed within a sheet metal compartment which forms a cubicle of the overall enclosure assembly. A vertical structural element 9, such as a tube, channel or angle, forms a portion of the enclosure structure, and pivotally supports handle 10. As shown, the handle extends out of the cubicle (to the right in the illustration) so that its uppermost end may be grasped by hand and the lever moved up and down to rack and unrack the contactor carriage.

A cross shaft 11 extends through subchassis 8, extending transversely thereacross near the bottom of the carriage. A pin 12 is coupled to the cross shaft by means of a lever 13 or the like, and the pin extends through a slot in the racking hook 2 so as to move the carriage backward and forward upon rotation of cross shaft 11. A first pushrod 15 is coupled to cross shaft 11 by means of an arm 14, the other end of the pushrod joining bellcrank 16 at a first attachment point. Another attachment point on the bellcrank, spaced from the first, couples a second rod 17 thereto. Rod 17 extends between the second attachment point and a similar, pivotal attachment point at the lowermost end of handle 10. The lowermost attachment point of the handle includes a pin which extends into a V-shaped groove (not visible in FIG. 1) in a detent arm 18. The latter arm is pivoted upon an axis extending between its ends, and biased in a counterclockwise direction by means of a coil spring 19.

In order to provide the necessary interlock function, an interlock lever 20 is pivoted intermediate its ends, and biased in a counterclockwise direction by another coil spring 21 at one end. The opposite end of the interlock lever comprises a latch element 22 which is adapted to fit into first or second notches 23, 24 in the edge of bellcrank 16.

In FIG. 1, the racking mechanism is shown in the "on," or fully racked, position. Handle 10 has been manually urged upwardly to its uppermost position, rotating the handle counterclockwise about its pivot point which in turn rotates bellcrank 16 clockwise. This motion urges first pushrod 15 leftward, moving arm 14 and cross shaft 11 in a counterclockwise direction. In so doing pin 12 is caused to move in an arc, to the left. Because pin 12 is captured within hook 2 of the contactor carriage it urges the carriage to the left, to a point at which the fingers or similar contacting elements on the carriage firmly and fully engage other, mating stabs or other conductive elements which are affixed within the enclosure (not shown). Such current-carrying elements are fixedly positioned such that when handle 10 is moved to its "on" position and the racking mechanism is in the position shown, the conducting elements are fully engaged. The carriage is ultimately stopped by hook 2 butting against cross shaft 11.

It will be noted that in the position shown in FIG. 1 bar 6 is at a low position and does not rotate interlock lever 20 to a point wherein latch member 22 will interfere with bellcrank 16. Once in the position shown, when the contactor closes armature 5 moves up to engage fixed contacts 4a, 4b and at the same time cross bar 6 moves vertically, rotating interlock lever 20 clockwise so that latch element 22 engages notch 23.

Because the engagement of the interlock lever with the bellcrank positively prevents operation of the racking mechanism when the contactor is closed, the unracking of the contactor carriage is prevented whenever current is flowing to a load. Breaking a current-carrying circuit by disengaging the stabs or fingers would give rise to arcing and the destruction or severe damage to the apparatus. For this reason it is necessary that the circuit be interrupted, and no load current flowing, before disengagement of the contactor from the line and load terminals.

While numerous linkages and geometries have been provided for racking and unracking purposes many have been extremely difficult to operate, with some requiring the assistance of heavy springs and the like. In some cases racking mechanisms require so much force that they can only be operated by very strong individuals. However, with the present system it has been found that even small, slender persons can rack and unrack the contactor carriage with little difficulty. This attribute is due in large part to the interaction of the various elements of the mechanism. In particular, it will be noted in FIG. 1 that a line $L_1$ is drawn extending between a first axis of rotation of cross shaft 11 and a second axis, that of bellcrank 16. Another line designated $L_2$ extends between the bellcrank axis and a third axis of rotation about which handle 10 pivots.

As handle 10 is urged upwardly, pivoting in a counterclockwise direction, it pushes down on rod 17 and rotates bellcrank 16 in a clockwise direction. As the mechanism approaches the fully racked position illustrated, the attachment point of rod 17 and bellcrank 16 moves further and further away from $L_2$ increasing the mechanical advantage, or leverage, at the bellcrank since an effectively longer lever arm is provided between the pivotal axis of the bellcrank and the attachment point of rod 17. At the same time the lower end of handle 10 and rod 17 are practically colinear so that a high mechanical advantage is achieved there also.

The foregoing effect is compounded by the relationship of the ballcrank axis and the first pivot point of rod 15 on the bellcrank. As handle 10 reaches the "on" position bellcrank 16 has rotated such that the attachment point of rod 15 thereon approaches line $L_1$, again increasing the mechanical advantage between the bellcrank and the pushrod.

An important feature of the present invention is the provision of a detent which prevents the handle from being forced to an open position by internal forces which tend to unrack the contactor carriage. In a preferred embodiment the second rod 17 and handle 10 "break" over center, that is, the attachment point of rod 17 on handle 10 passes through a line drawn between the pivot point of the handle and the lower end of the rod, so that it attains the position shown. It will be seen that any movement of the carriage 1 to the right will tend to rotate cross shaft 11 clockwise, pushing rod 15 to the right and rotating bellcrank 16 in a counterclockwise direction. This in turn will give rise to an upward push on second rod 17. However, since the attachment point of the rod and handle has "broken" over center, the effect will only be to move handle 10 in a counterclockwise direction. Since the handle has already reached the end of its travel, it blocks further movement of the racking mechanism.

The overcenter geometry just discussed contributes to a "detent" action since in moving handle 10 down the attachment point of the handle and rod 17 must once more go through center, producing some increased resistance to the intital movement of the handle. In some installations, particularly where the above-mentioned over center configuration may not always be obtained, it has been found desirable to provide an additional detent to the system. For this reason detent arm 18 is mounted at a point which is stationary with respect to the enclosure, and biased by spring 19. A generally v-shaped notch in the right end of arm 18 engages a pin extending from the attachment point at the bottom of the handle. The left side of the v-shaped notch (better seen in FIG. 2) extends at an angle which interferes with the movement of the pin, which is generally transversely to the direction of the handle and in an arc centered about the pivot point of the handle. In a preferred embodiment, the left face of the v-shaped notch was cut at substantially 43° with respect to a line tangent to the arc described by the pin.

Referring to FIG. 2, the mechanism is shown in an open or unracked position wherein the contactor carriage is withdrawn from engagement with the bus bars or stabs, but is still within the enclosure. In FIG. 2 handle 10 has been pulled down, overcoming the frictional engagement of detent arm 18 and the over center position of the attachment point between rod 17 and handle 10. Rod 17 has pulled bellcrank 16 about in a counterclockwise direction, in so doing pulling rod 15 to the right. This in turn effects a clockwise movement of cross shaft 11. Pin 12 moves to the right, urging hook 2 rearwardly a distance d, and also causing pin 12 to clear the bottom of the hook, so that the contactor carriage can be withdrawn from the enclosure.

It is important to note the geometry of the linkage at this point. It is supposed that as soon as the stabs and/or fingers of the contactor and stationary bus rigging have cleared one another, very little force will be required to move the contactor further. Hence, the mechanical advantage required of the racking mechanism is small. Accordingly, it will be noted that the attachment point of push rod 15 on the bellcrank has moved further away from line $L_1$; owing to the relatively large lever arm between the attachment point and the axis of rotation of the bellcrank, less force can now be transmitted for turning cross shaft 11.

At the same time the mechanical advantage afforded rod 17 on the bellcrank is diminished considerably, the effective lever arm between the attachment of lever 17 on the bellcrank and the pivot point of the bellcrank itself having diminished greatly. In other words, during the unracking operation the pivot point of rod 17 approaches line $L_2$. At the same time the attachment point of rod 17 and handle 10 has moved further away from line $L_2$ further decreasing the mechanical advantage between the handle and the bellcrank. While the mechanical advantage of the system decreases, owing to the greater distance between the handle attachment point and line $L_2$, a greater degree of linkage movement occurs which facilitates unracking of the carriage.

Also shown in FIG. 2 cross shaft 6 has moved to an upper position, corresponding to closure of the contactor. In such a situation it is presumed that power is available to operate the contactor, for instance for test purposes. However, it is necessary to prevent the contactor from being racked back in again while it is closed; should this occur, completion of an electric circuit may occur as the fingers and stabs touch one another, resulting in damage or destruction of these elements.

In order to assure that circuit making and breaking is done only by the contactor elements, racking of an already-closed contactor is prevented. With the contactor closed and bar 6 raised, interlock lever 20 is rotated clockwise so that latch 22 engages slot 24 in the edge of the bellcrank.

It will now be appreciated that the racking mechanism shown embodies numerous advantages over the prior art, not the least of which is a direct locking of the mechanism itself whenever the contactor is closed. In addition the particular combination of elements of the system and their interrelationship provides the maximum mechanical advantage when it is needed, for completing the racking of the contactor, thus enabling the racking to be accomplished without the need for gears, spring assists, or the like. Finally, this system is economical to manufacture and is well adapted to be mounted upon a rigid subchassis disposed within a cubicle and to be linked to a cubicle-mounted handle by means of a single push rod 17. This arrangement accommodates considerable misalignment between the cubicle and subchassis, or distortion of the outside cubicle housing, without any detrimental effect upon the operation of the racking mechanism or, more importantly, of the interlocking operation which is contained upon the rigid subchassis.

As will be evident from the foregoing description, certain aspects of the invention are not limited to the particular details of the example illustrated, and it is therefore contemplated that other modifications or applications of this invention will occur to those skilled in the art. It is accordingly intended that the appended claims shall cover all such modifications and applications as do not depart from the true spirit and scope of the invention.

What is claimed as new and desired to be secured by Letters Patent of the United States is:

1. In a controller for applying and disconnecting electric power to and from a load compromising an outer enclosure and a rigid structure receiving a carriage disposed within the enclosure said carriage including a circuit interrupting mechanism;
   - a cross shaft member pivoted in said structure and extending transversely therethrough for engaging the circuit interrupting mechanism-bearing carriage and urging said carriage back and forth within said structure;
   - an arm coupled to said cross shaft member;
   - a bellcrank pivotally mounted to said rigid structure;
   - an elongate handle pivotally mounted with respect to said rigid structure and including a first, manually-engaged end and a second end and a pivot point intermediate the ends thereof;
   - a first rod connected to said bellcrank at a coupling point and coupling said bellcrank to said arm; and
   - a second rod coupling said bellcrank to the second end of said handle.

2. The invention defined in claim 1, wherein when said handle is moved to a first position, said cross shaft member is thereby caused to be moved to draw said carriage into said enclosure; the coupling point of said first rod and said bellcrank is moved closer to a line extending between the axis of said cross shaft member and the pivot point of said bellcrank; and the coupling point of said second rod and said bellcrank is moved further away from a line extending between the pivot points of said bellcrank and said handle.

3. The invention defined in claim 2, wherein said bellcrank is provided with at least one notch in the periphery thereof, further inluding a pivoted lever having a first end for engaging said notch and a second end for engaging a portion of said circuit interrupting mechanism whose position reflects the open or closed status of the mechanism for rotating said lever into engagement with said bellcrank when said mechanism is closed.

4. The invention defined in claim 2, wherein when moving to an engaged position, the point at which said second rod and said handle are coupled crosses said line extending between said pivot points of said bellcrank and said handle.

5. In a controller for applying and disconnecting electric power from a load and including a contactor mechanism capable of being racked and withdrawn from the controller, an improved racking mechanism comprising;
   - a rotatable shaft having a first axis of rotation and extending transversely to the direction of movement of the contactor mechanism upon being racked or withdrawn;
   - engagement means extending radially from said shaft for engaging the contactor mechanism;
   - a first arm extending radially from said shaft and having an attachment point;
   - a bellcrank mounted for pivotal rotation about a second axis generally parallel to said shaft and having a first and second attachment points spaced from said axis, said bellcrank further having at least one recess in the periphery thereof;
   - a first connecting rod having a first end coupled to said first arm at the attachment point thereon, and to said bellcrank at said first attachment point thereon;
   - handle means mounted for pivotal rotation about a third axis intermediate the ends of said handle means and generally parallel to said shaft and having a first end adapted to be manually grasped and a second end having an attachment point thereon;
   - a second push rod having a first end coupled to said bellcrank at said second attachment point thereon and a second end coupled to said handle means at the attachment point thereon;
   - when said handle means is rotated to a position for racking said contactor mechanism, said second attachment point moves further away from a line joining the second and third axes and said attachment point on said handle means moves closer thereto, and said first attachment point moves closer to a line joining said first and second axes, whereby the mechanical advantage from said handle means to said engagement means increases as said contactor mechanism approaches a fully racked position.

6. The invention defined in claim 5, further including an interlock lever pivotally mounted about a fourth axis generally parallel to said shaft, and having a latch member for engaging a recess in said bellcrank; biasing means for holding said latch member out of engagement with said recess; and movable means on said contactor mechanism for rotating said interlock lever into engagement with said recess when said contactor mechanism is closed.

7. The invention defined in claim 6, wherein said bellcrank is provided with two recesses for engaging said interlock lever; one of said recesses aligning with said latch member when the racking mechanism is in a racked position, the second recess aligning with said latch member when said racking mechanism is in an unracked position.

8. The invention defined in claim 5, wherein the attachment point on said handle means crosses a line extending from said second attachment point and said handle means when said handle means is moved from an unracked to a racking position.

9. The invention defined in claim 5, further including detent means for assisting in holding said handle means in said racked position, comprising an arm pivoted intermediate the ends thereof;
   - spring means coupled to a first end of said arm and biasing said arm for rotation in a first direction;
   - a notch in a second end of said arm for receiving a pin extending through the attachment point of said handle means, said spring means urging said arm against said pin, said notch having a surface bearing against said pin, said surface being inclined at an angle of substantially 45° to the direction of motion of said pin when said handle means is moved to an unracking position.

* * * * *